W. S. LAMSON.
AUTOMATIC CASH CARRIER
No. 258,584. Patented May 30, 1882.
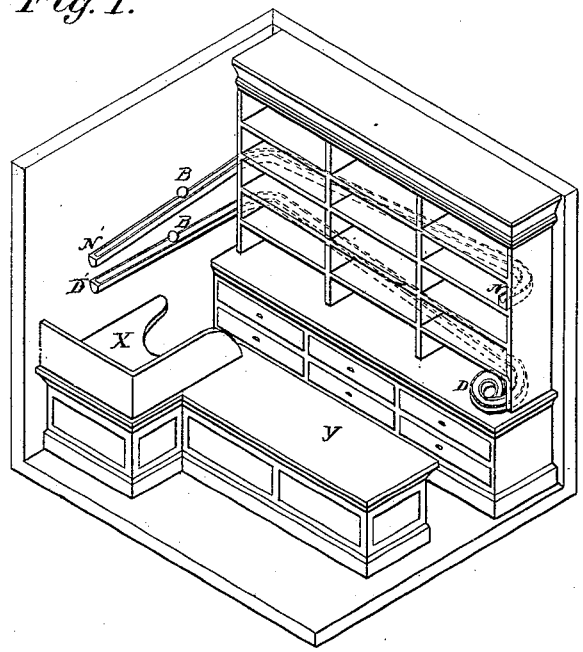
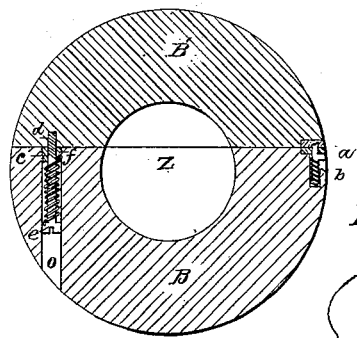
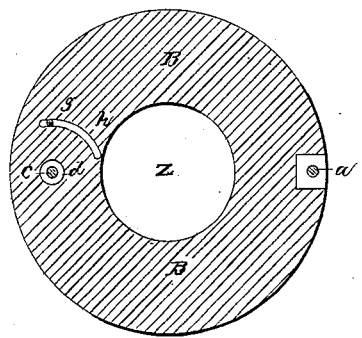
Witnesses.
George A. W[...]
Irving S. Porter.
Inventor.
William S. Lamson
By Albert M. Moore
His Attorney

UNITED STATES PATENT OFFICE.

WILLIAM S. LAMSON, OF LOWELL, ASSIGNOR TO THE LAMSON CASH CARRIER COMPANY, OF BOSTON, MASSACHUSETTS.

AUTOMATIC CASH-CARRIER.

SPECIFICATION forming part of Letters Patent No. 258,584, dated May 30, 1882.

Application filed December 3, 1879.

*To all whom it may concern:*

Be it known that I, WILLIAM S. LAMSON, of Lowell, in the county of Middlesex and Commonwealth of Massachusetts, have invented certain new and useful Improvements in Automatic Cash-Carriers, of which the following is a specification.

My invention relates to oppositely-inclined ways connecting the stations of salesmen and the cashier's desk in a store, and rolling boxes or hollow spheres moved on said ways by the force of gravity, and to the construction of such ways and boxes in order to retain said boxes upon said ways, to open and close said boxes, and to prevent said boxes from opening while traveling on said ways.

In the accompanying drawings, Figure 1 shows the inclined ways as applied in a shop or store, also a cashier's desk and counter. Fig. 2 is a vertical section of the box and cover through the hinge and catch, and Fig. 3 is a horizontal section of the ball or the top of the box. Fig. 4 is a small portion of the box, showing the beveled catch-pin.

N N' and D D' are inclined ways secured to the walls of a store. In these ways run the balls B. The balls or rolling boxes B B' are hollow spheres, each consisting of two unequal segments, the smaller one, B', being the cover and the larger one, B, being the box proper. To connect the box and cover together a hole, o, is drilled in the box B, at right angles to the top of the same, and in this hole is placed a stud, e, the upper end of which is provided with a screw-thread, d, and screwed into the cover B'. The lower end of the stud e has a head or enlargement, (see Fig. 2,) which is slotted, so that the stud e may be turned by a screw-driver. The upper end of the hole o is bushed to fit said stud. A spring, f, of spiral form surrounds the stud e, between the head or lower end of the latter and the bushing c, one end of the spring being secured to the bushing c and the other end to the lower end of said stud. This spring holds the cover B' down upon the box B, and also swings the cover round upon said stud and opens the box whenever the catch releases the cover. The distance to which the box can be opened is determined by the length of the groove h, (which groove is an arc of a circle cut in the top of the box B about the stud e as a center,) into which groove a pin, g, securely driven into the bottom of the cover B', enters. On the opposite side of the box and parallel to the stud e is a pin, a, provided with a shoulder, around which pin and under which shoulder is a spiral spring, b, which throws said pin a up, (into the cover B' if the cover be closed,) the cover being provided with a hole to receive the upper end of the pin a. The pin a and spring b together form a catch to keep the box closed when desired. The pin a is beveled on top on one side so that it may be forced down by shutting the cover.

The inclined way N N' consists of a trough of suitable size placed against the wall of a store, saloon, or other place, and inclining from a point conveniently near the position occupied by a salesman at the counter y to the desk x of the cashier. Below the way N N' is another way, D' D, inclined in the opposite direction and running from the cashier's desk to a point below the end N of the first-named way. These ways, where convenient to do so, are placed behind the shelves on which the goods are placed.

A salesman receiving money from a customer at the counter y opens the ball B by pressing down the shoulder of the pin a, thus allowing the cover B' to swing open, places the money, with a memorandum of price, in the hollow Z of said ball, swings the cover into its place, where it is retained by the pin a, and places the ball, with its contents, on the way N N'. The ball then travels by its own weight to the desk of the cashier, who removes the money and sends back the empty ball, or the ball containing the customer's change, by the lower way, D' D, to the salesman.

Any desired number of these ways may be used, communicating with different parts of a store, and spouts or short ways communicating with the way N N' may be placed at convenient intervals to serve for a number of salesmen.

The use of this invention dispenses with cash-boys, and thereby effects a considerable saving of money and the noise of calling the boys from distant parts of the store. This device is always on hand and works promptly and efficiently.

I claim as my invention—

1. In a cash-carrier for stores, the combination of oppositely-inclined ways N N' D' D, and a rolling cash holder or box, B B', substantially as and for the purpose specified.

2. In a cash-carrier for stores, the combination of oppositely-inclined ways N N' D' D, adapted to the cashier's desk $x$ and counter $y$ of a store, and hollow rolling balls B B', adapted to receive and carry cash on said ways, as and for the purpose specified.

3. The combination, with the counters $y$ and desk $x$ of a store, of two ways, N N' D' D, connecting the same, each way consisting of a trough, substantially as set forth.

4. The combination of the box B and the cover B', turning one upon the other, as specified, the pin $a$ and spring $b$, as and for the purpose specified.

5. The combination of the box B, the cover B', the spring $b$, and the pin $a$, beveled on the top, as and for the purpose specified.

WILLIAM S. LAMSON.

Witnesses:
ALBERT M. MOORE,
IRVING S. PORTER.